United States Patent [19]

Toda et al.

[11] Patent Number: 5,260,367
[45] Date of Patent: Nov. 9, 1993

[54] VEHICLE DAMPING SHEET

[75] Inventors: Tetsuro Toda, Hiroshima; Atsunori Kishimoto, Higashi-Hiroshima, both of Japan

[73] Assignee: Toda Kogyo Corp., Hiroshima, Japan

[21] Appl. No.: 744,575

[22] Filed: Aug. 13, 1991

Related U.S. Application Data

[63] Continuation-in-part of Ser. No. 476,046, Feb. 8, 1990, abandoned.

[30] Foreign Application Priority Data

Feb. 15, 1989 [JP] Japan ................................... 1-35838
May 17, 1989 [JP] Japan ................................. 1-125120

[51] Int. Cl.⁵ .............................................. C08K 3/34
[52] U.S. Cl. .................................... 524/449; 524/435; 524/59; 524/64
[58] Field of Search ................... 524/449, 435, 59, 64

[56] References Cited

U.S. PATENT DOCUMENTS

| | | | |
|---|---|---|---|
| 3,994,845 | 11/1976 | Blachford | 260/42.52 |
| 4,325,858 | 4/1982 | Saito et al. | 524/524 |
| 4,838,939 | 6/1989 | Kanda et al. | 106/281.1 |

FOREIGN PATENT DOCUMENTS

| | | |
|---|---|---|
| 52-50522 | 4/1977 | Japan . |
| 60-215013 | 10/1985 | Japan . |
| 60-215014 | 10/1985 | Japan . |
| 61-103977 | 5/1986 | Japan . |
| 61-151227 | 7/1986 | Japan . |
| 63-156859 | 6/1988 | Japan . |
| 1310241 | 3/1973 | United Kingdom . |

*Primary Examiner*—Paul R. Michl
*Assistant Examiner*—Edward Cain
*Attorney, Agent, or Firm*—Nixon & Vanderhye

[57] ABSTRACT

Disclosed herein is a vehicle damping sheet comprising a blend-mixture comprising a filler composed of mica, iron oxide particles and a auxiliary filler, and a binder, each of the amounts of the mica, the iron oxide particles and the auxiliary filler being not less than 5 parts by weight based on 100 parts by weight of the binder, the total amount of the mica, the iron oxide particles and the auxiliary filler being not less than 30 parts by weight based on 100 parts by weight of the binder, and the content of the iron oxide particles in the blend-mixture being from 2 to 40% by weight.

7 Claims, 3 Drawing Sheets

VEHICLE DAMPING SHEET

CROSS-REFERENCE TO RELATED APPLICATION

This application is a continuation-in-part of U.S. patent application Ser. No. 476,046 filed on Feb. 8, 1990.

BACKGROUND OF THE INVENTION

The present invention relates to a vehicle damping sheet applicable to floors, dash panels, etc. of automobiles and, more in particular, it relates to a vehicle damping sheet of light-weight, having high damping effect.

As is well known, damping material has been used generally to various application-uses for the protection of precision equipments against vibrations, damping of vibrations of engines in vehicles, etc. and damping of vibrations of floors and walls in buildings or houses.

As damping sheets used for vehicle damping material, there have been proposed damping sheets comprising blends of inorganic fillers such as carbonate, mica and clay, and as a binder, bituminous material such as asphalt [refer to Japanese Patent Application Laid Open (KOKAI) No. 63-156859 (1988) and Japanese Patent Publication No. 52-50522 (1977)] as well as noise-insulation sheets comprising blends of a thermoplastic resin such as vinyl chloride resin as a binder, iron or iron oxide, and silicon oxide [refer to Japanese Patent Application Laid Open (KOKAI) No. 61-57632 (1986)]. There are further proposed damping sheets comprising blends of an epoxy resin as the binder, iron oxide or iron oxide, and mice [refer to Japanese Patent Application Laid Open (KOKAI) No. 60-215013 (1985), No. 60-215014 (1985), No. 61-103977 (1985), No. 61-151227 (1986), and No. 63-178037 (1988)].

In particular, Japanese Patent Application Laid Open (KOKAI) No. 60-215013 (1985) discloses a damping material comprising a composition composed of 100 parts by weight of an epoxy resin and a curing agent; 0.1 to 70 parts by weight of a different kind polymeric material such as nitrile rubber, butadiene rubber, polyethylene, polypropylene and modified polyethylene; 40 to 900 parts by weight of a granular iron oxide such as $Fe_2O_3$ and $Fe_3O_4$; 0.5 to 50 parts by weight of a fibrous material such as asbesto and polyamide; and 0.5 to 50 parts by weight of a flaky filler such as mica, graphite flake, alumina flake, etc.

Further, Japanese Patent Application Laid Open (KOKAI) No 61-151227 (1986) discloses a damping material comprising a composition composed of 100 parts by weight of an epoxy resin and a curing agent; 50 to 500 parts by weight of a flaky filler such as mica, alumina flake and iron oxide flake; 0.5 to 200 parts by weight of a granular filler such as calcium carbonate, talc and ferrite; 0.5 to 100 parts by weight of a fibrous material such as asbesto, polyamide fiber and carbon fiber; and 80 to 300 parts by weight of a plasticizer.

Generally, the damping effect of a damping sheet has a close relationship with the loss of viscosity of the damping sheet and in order to increase the damping effect, there has been adopted a method of controlling the composition of the damping sheet so as to increase the viscosity loss, or increasing the thickness of the damping sheet, etc.

In addition, the damping effect can also be improved by increasing the weight of the damping sheet and, in this case, there has been adopted a method of adding a great amount of a high density filler.

That is, for improving the damping effect, the conventional damping sheets has usually been manufactured by controlling the composition so as to increase the viscosity loss, increasing the thickness of the damping sheet or incorporating a great amount of various fillers to increase the weight thereof.

However, when a damping sheet with increased thickness and weight is used for vehicles such as automobiles, it increases the weight of the vehicle and is not suitable to vehicles for which light-weight thereof is demanded. In the case of manufacturing a damping sheet incorporating a great amount of filler, since the damping effect can be improved, particularly, by increasing the content of the filler, the aimed damping effect can be obtained even when the thickness of the sheet is reduced as compared with the case of containing a less amount of filler. However, as the result, various problems such as worsening of the physical property of the damping sheet and the fusing property, and further, lowering in the productivity due to the increased mechanical abrasion upon manufacturing the sheet, occur.

For obtaining a vehicle damping sheet as the vehicle damping material of light weight and having a high damping effect within a wide temperature range, the present inventors have made a study on a damping effect of the damping sheet prepared by molding a blend mixture comprising a filler and a binder into a sheet, as well as the relationship between the filler and the binder as the starting materials, and as a result, it has been found that a vehicle damping sheet of light-weight and having high damping effect within a wide temperature range can be obtained by:

selecting a combination of mica and iron oxides particle as one of a filler, selecting, as a binder those (a) containing a bituminous material, or (b) containing an ethylene-vinyl acetate copolymer, and adjusting the mixing ratio of each of mica and iron oxide particles to not less than 5 parts by weight based on 100 parts by weight of the binder, the mixing ratio of the filler to not less than 30 parts by weight based on 100 parts by weight of the binder and the amount of the iron oxide particles in the blend-mixture to 2 to 40% by weight. Based on the finding, the present invention has been attained.

SUMMARY OF THE INVENTION

In an aspect of the present invention, there is provided a vehicle damping sheet comprising a blend-mixture comprising a filler composed of mica, iron oxide particles and a auxiliary filler, and a binder containing (a) a bituminous material or (b) ethylene vinyl acetate copolymers, the amount of said auxiliary filler being not less than 5 parts by weight based on 100 parts by weight of said binder, each of the amounts of said mica and said iron oxide particles being 5 to 200 parts by weight based on 100 parts by weight of said binder, the total amount of said mica, said iron oxide particles and said auxiliary filler being not less than 30 parts by weight based on 100 parts by weight of said binder, and the content of said iron oxide particles in said blend-mixture being from 2 to 40% by weight.

DETAILED DESCRIPTION OF THE INVENTION

Figure 1:
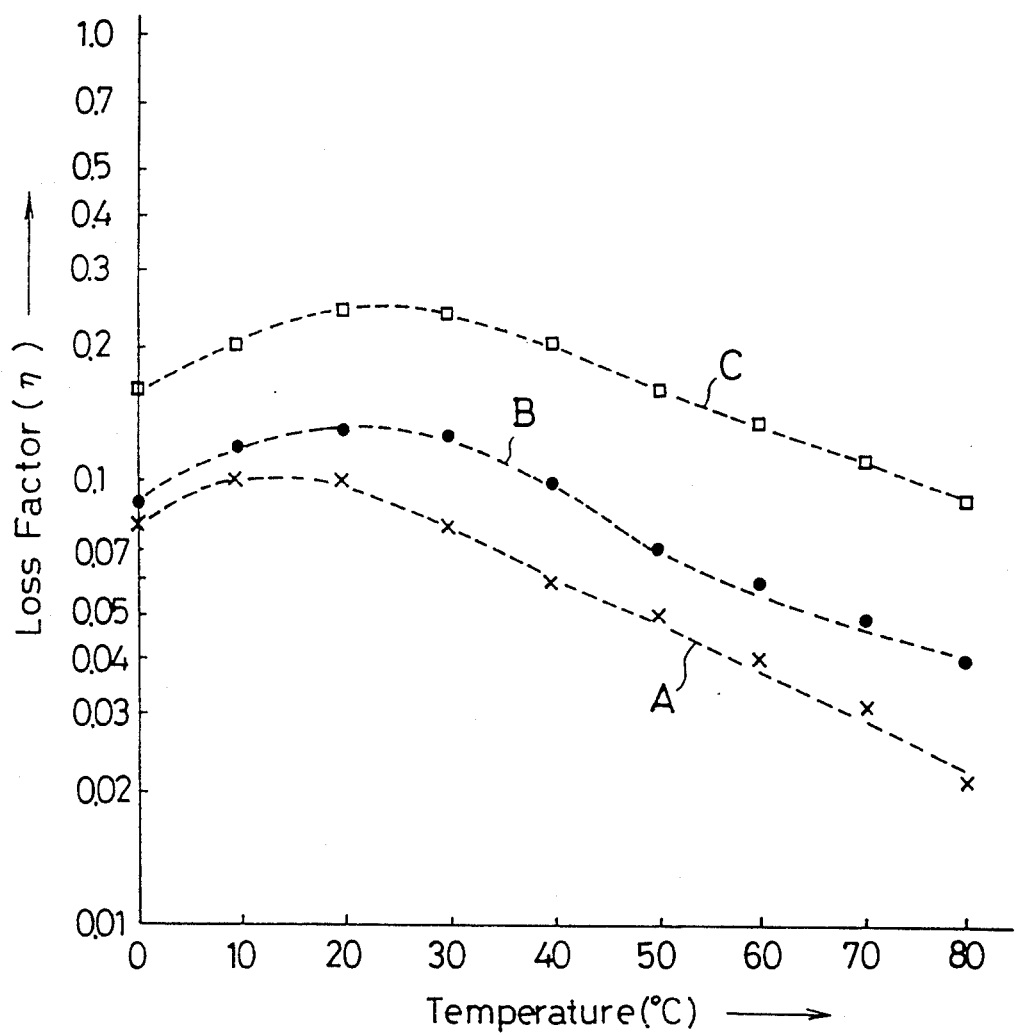
FIG. 1 shows the loss factor ($\eta$) of the vehicle damping sheets at each temperature obtained by Reference Examples 1-3.

The binder used in the present invention is composed of those (a) containing a bituminous material or (b) containing an ethylene-vinyl acetate copolymers.

(a) As the bituminous material contained in the binder used in the present invention, asphalts, more specifically, straight asphalt, blown asphalt, semi-blown asphalt, Trinidad asphalt and lake asphalt produced abundantly in Europe, etc., may be exemplified, and they are used alone or as a mixture thereof for with conforming beats of floors depending on the shape of vehicle floors.

The binder containing not less than 20% by weight, more preferably, from 20 to 80% by weight of the bituminous material is preferred. If it is less than 20% by weight, heat bondability of the damping sheet to sheet plate materials of a vehicle tends to be reduced.

(b) The other binder used in the present invention contains ethylene-vinyl acetate copolymers, and they are used alone or as a mixture thereof for conforming with the shape of a vehicle floor, for example, conforming with beats of floor portions. In a case of using ethylene-vinyl acetate copolymers, the vinyl acetate content is preferably from 25 to 60%.

It is preferred the binder contains not less than 5% by weight, more preferably 10 to 80% by weight of the ethylene-vinyl acetate copolymers. If the content is less than 5% by weight, heat bondability of the damping sheet to steel plate of a vehicle tends to be reduced and the sheeting upon production of the damping sheet is difficult.

In the case where cold proofness or weather proofness is poor and heat bondability to steel plate is insufficient when only the bituminous material is used as the binder, the bituminous material can be modified by adding a polymeric material. Also, in a case of using the ethylene-vinyl acetate copolymers, since the cost is generally increased as the content of the vinyl acetate is increased, a polymeric material other than ethylene-vinyl acetate copolymer for reducing the cost of the damping sheet, which can also change peaks for the damping effect at a predetermined temperature may be added.

As the polymeric material used in the present invention, rubbers such as natural rubber, nitrile rubber, isoprene rubber, butyl rubber, acryl rubber, urethane rubber, styrene-butadiene rubber, styrene-isobutylene rubber, ethylene-propylene rubber and chloroprene rubber or modified products thereof; as well as petroleum resin, terpene resin, rosin resin, cumaron resin and phenol resin may be exemplified. Among them, petroleum resin, terpene resin, rosin resin, cumaron resin and phenol resin can increase the heat bondability to the steel plate and, at the same time, can vary the peaks of the damping effect between 20°-50° C. by changing the molecular weight, softening point, etc. of the used resin, and it is useful to obtain a damping sheet effective within a temperature range required for floors, dash panels, etc. of automobiles.

The combination of the bituminous material or the ethylene-vinylacetate copolymer with petroleum resins is preferred. The amount of the petroleum resins in the binder is preferably from 10 to 80% by weight.

In order to vary the peaks for the loss factor and improve the dispersibility, an additive may be further added. As the additive used in the present invention, process oil, DOP, stearic acid, Zn stearate, Mg stearate and Ca stearate may be exemplified and there are used alone or as a mixture thereof at a ratio of not more than 20% by weight in the binder material. In particular, a naphthenic or aromatic process oil can improve the cold proofness of the damping sheet and can vary the peaks for the damping effect within about a 10° C. range.

As the mica used in the present invention, either of white mica or black mica may be exemplified and the size thereof is, preferably, not greater than 350 $\mu$m, more preferably from 50 to 350 $\mu$m.

The blending amount of mica, in a case where (a) the binder containing bituminous material are used, is from 5 to 200 parts by weight, preferably from 20 to 150 parts by weight based on 100 parts by weight of the binder.

If it is less than 5 parts by weight, no sufficient damping effect can be obtained. On the other hand, if it exceeds 200 parts by weight, the damping effect is saturated and, at the same time, the productivity upon forming the damping sheet tends to be reduced.

The blending amount of mica, in a case where (b) the binder containing ethylene-vinyl acetate copolymers is used, is from 5 to 200 parts by weight, preferably from 20 to 150 parts by weight based on 100 parts by weight of the binder. If it is less than 5 parts by weight, no sufficient damping effect can be obtained. On the other hand, if it exceeds 200 parts by weight, the damping effect saturated and, at the same time, the productivity upon forming the damping sheet tends to be reduced.

As the iron oxide particles used in the present invention, $\alpha$-FeOOH particles, $\gamma$-FeOOH particles, $\delta$-FeOOH particles, FeO particles, $\alpha$-Fe$_2$O$_3$ particles, $\gamma$-Fe$_2$O$_3$ particles, Fe$_3$O$_4$ particles and sintered particles thereof, as well as spinel ferrite particles containing metals such as Zn, Mn, Co, Ni, Cu, Mg and Li may be exemplified, and they are used alone or as a mixture thereof. The use of a Fe$_3$O$_4$ and $\gamma$-Fe$_2$O$_3$ particles are preferred. The preferred particle size is within a range from 0.05 to 100 $\mu$m, more preferably from 0.05 to 10 $\mu$m and, most preferably from 0.1 to 1 $\mu$m in view of the property and the economical advantage.

The blending amount of the iron oxide particles, in a case where the binder (a) containing bituminous material are used, is from 5 to 200 parts by weight, preferably from 5 to 100 parts by weight, more preferably from 5 to 80 parts by weight based on 100 parts by weight of the binder. If it is less than 5 parts by weight, no sufficient damping effect can be obtained. On the other hand, if it exceeds 200 parts by weight, the damping effect is saturated and, at the same time, the productivity upon forming the damping sheet tends to be reduced.

The blending amount f the iron oxide particles, in a case where the binder (b) containing ethylene-vinyl acetate copolymers is used, is from 5 to 200 parts by weight, preferably from 5 to 100 parts by weight, still more preferably from 5 to 80 parts by weight based on 100 parts by weight of the binder. If it is less than 5 parts by weight, no sufficient damping effect can be obtained. On the other hand, if it exceeds 200 parts by weight, the damping effect is saturated and, at the same time, the productivity upon forming the damping sheet tends to be reduced.

As the auxiliary filler used in the present invention, calcium carbonate, clay, talc, barium sulfate, asbestos, silica balloon, fibrous material such as waste paper, chemical fiber and wood fiber, etc. may be exemplified and they are used alone or as a mixture thereof. In particular, the fibrous material such as waste paper, chemical fiber or wood fiber can reduce the flow property of the damping sheet when it is thermally fused to the floor panel of an automobile, thereby preventing disconnection or sagging.

The blending amount of the auxiliary filler, in a case where the binder (a) containing the bituminous material are used, is not less than 5 parts by weight, preferably from 5 to 100 parts by weight, more preferably from 10 to 80 parts by weight based on 100 parts by weight of the binder. If it is less than 5 parts by weight, no sufficient damping effect can be obtained. On the other hand, if it exceeds 100 parts by weight, the damping effect is saturated and, at the same time, the productivity or workability upon forming the damping sheet tends to be reduced.

The blending amount of the auxiliary filler, in a case where the binder (b) containing the ethylene-vinyl acetate copolymers is used, is not less than 5 parts by weight, preferably from 5 to 100 parts by weight, more preferably from 5 to 80 parts by weight based on 100 parts by weight of the binder. If it is less than 5 parts by weight, no sufficient damping effect can be obtained. On the other hand, if it exceeds 100 parts by weight, the damping effect is saturated and, at the same time, the productivity upon forming the damping sheet tends to be reduced.

The total amount of the mica, the iron oxide particles and the auxiliary filler in the present invention is not less than 30 parts by weight, preferably from 50 to 300 parts by weight based on 100 parts by weight of the binder. If it is less than 30 parts by weight, no sufficient damping effect can be obtained.

The ratio of the iron oxide particles in a blend-mixture composed of the binder and the filler according to the present invention is from 2 to 40% by weight, preferably, from 3 to 35% by weight. If it is less than 2% by weight, no sufficient damping effect can be obtained. On the other hand, if it exceeds 40% by weight, it is not practical since machinery parts such as rolls suffer from abrasion upon manufacturing the damping sheet, as well as the physical property of the sheet is worsened and the workability upon mounting the sheet to the vehicle is also reduced.

For obtaining a more excellent damping effect, it is preferable to select the blending ratio (by weight) of the iron oxide particles to mica in a range from 0.05-10:1, preferably 0.05-5:1.

The vehicle damping sheet according to the present invention has various excellent properties such as high damping effect, light-weight and wide working temperature range due to the blend of mica, iron oxide particles and the auxiliary filler each in a predetermined amount.

Namely, the damping sheet according to the present invention has a damping effect from 2 to 4 times as high as conventional products, and so the thickness can be reduced to $\frac{1}{2}$ to $\frac{1}{3}$ when a damping sheet having a damping effect as comparable with that of the conventional product is manufactured, by which the weight of the sheet can be reduced.

A peak for the loss factor ($\eta$) of the vehicle damping sheet of the present invention is not less than 0.20 and is present within the range of 20° to 40° C. which is a practical operating temperature range. Further, a loss factor ($\eta$) of the vehicle damping the present invention in the range of 10° to 50° C. is not less than 0.07. The vehicle damping sheet of the present invention has a high bending resistance (The outer diameter of a rod is not less than 20 mm in the bending resistance test at a temperature of 20° C. using a test piece of a calender-rolled sheet having 2 mm in thickness).

Further, the vehicle damping sheet according to the present invention is excellent in the sheet property and can improve the workability upon mounting to vehicles.

EXAMPLES

The present invention will be described referring to examples and comparative examples, but it should be understood that the invention is not restricted only to these examples.

The loss factor ($\eta$) in the present invention was measured by a resonance method. Further, the bending test was conducted by winding a calender-rolled sheet around a round rod of 1 inch outer diameter and the bending resistance was judged based on the absence or presence of cracks at the surface of the sheet.

EXAMPLE 1

To a binder to 60 parts by weight of blown asphalt and 40 parts by weight of petroleum resin, a filler of 10 parts by weight of $Fe_3O_4$ particles (size: 0.3 $\mu$m) as the iron oxide particles, 65 parts by weight of mica (size: 150 $\mu$m), 25 parts by weight of calcium carbonate, 5 parts by weight of waste paper and 10 parts by weight of a process oil was added and blended. After mixing under heating the blend in a dispersion mixer at 200° C. ±20° C. for 10 min., the thus obtained blend-mixture was rolled spread by a calender roll to prepare a vehicle damping sheet of 2 mm in thickness.

The resultant vehicle damping sheet was cut into 15 mm in width and 270 mm in length and set on a steel plate substrate of 0.8 mm in thickness (15×300 mm) and fused under heating at 150° C. for 30 min. to obtain a test specimen. The loss factor ($\eta$) of each of the specimens at each temperature was obtained by a resonance method. The results are as shown in Table 1 and the products were excellent in the damping effect, as well as in the bending resistance.

EXAMPLES 2-6, COMPARATIVE EXAMPLES 1-3, REFERENCE EXAMPLE 1-3

After manufacturing vehicle damping sheets in the same procedures as those in Example 1 except for using materials of compositions each shown in Table 1, test specimens for evaluating the damping effect were obtained. The loss factor ($\eta$) at each temperature of the test specimen was as shown in Table 1.

The damping sheets of the Reference Examples 1 to 3 are those produced by using known calcium carbonate (Reference Example 1), 3 mm (Reference Example 2) and 6 mm (Reference Example 3), respectively. The relationships of the loss coefficient of the damping sheets of the Reference Examples 1 to 3 and a temperature are shown in FIG. 1, respectively. In the FIG. 1, the curve A denotes the Reference Example 1, the curve B denotes the reference Example 2 and the curve C denotes the Reference Example 3. As seen from FIG. 1, it is clear that the loss factor of the damping sheet is improved, as the damping sheet thicken.

Figure 2:
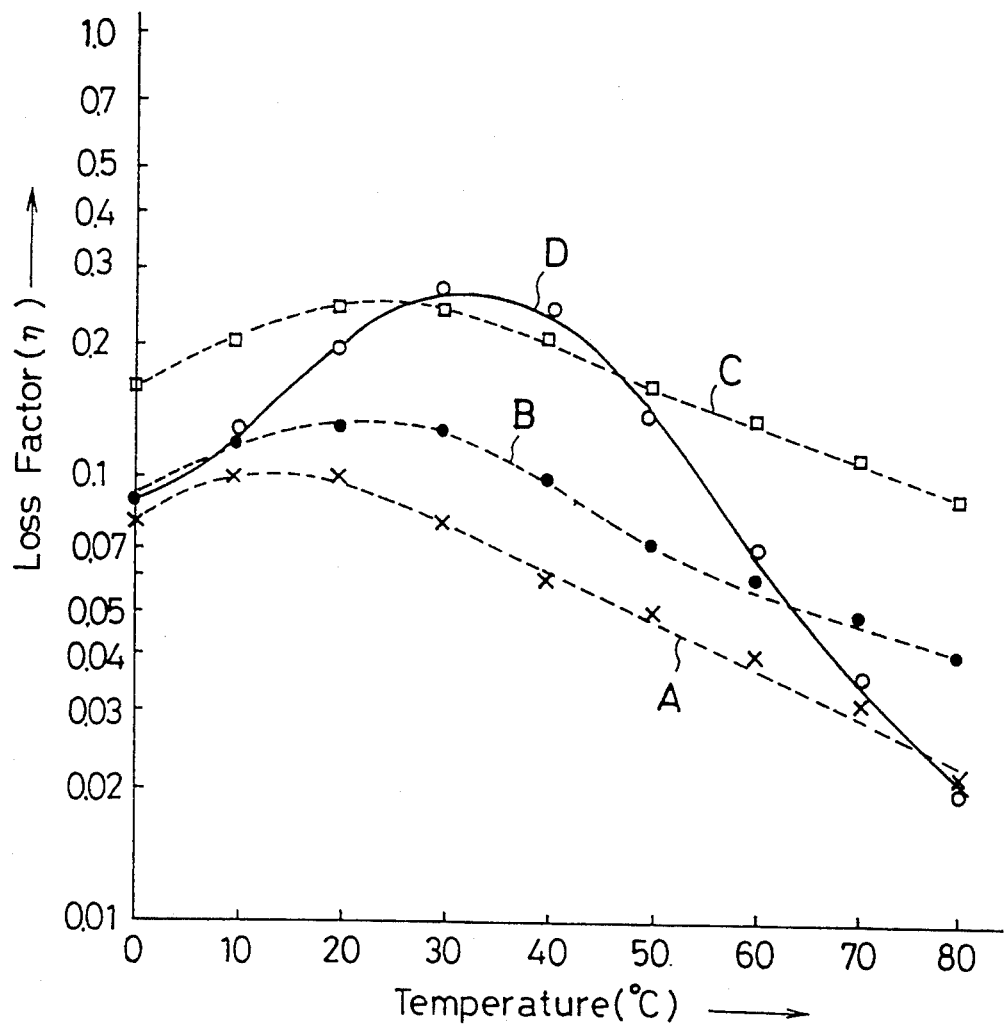
FIG. 2 shows the loss factor ($\eta$) of the vehicle damping sheets at each temperature obtained by Example 1 and Reference Example 1-3.
Figure 3:
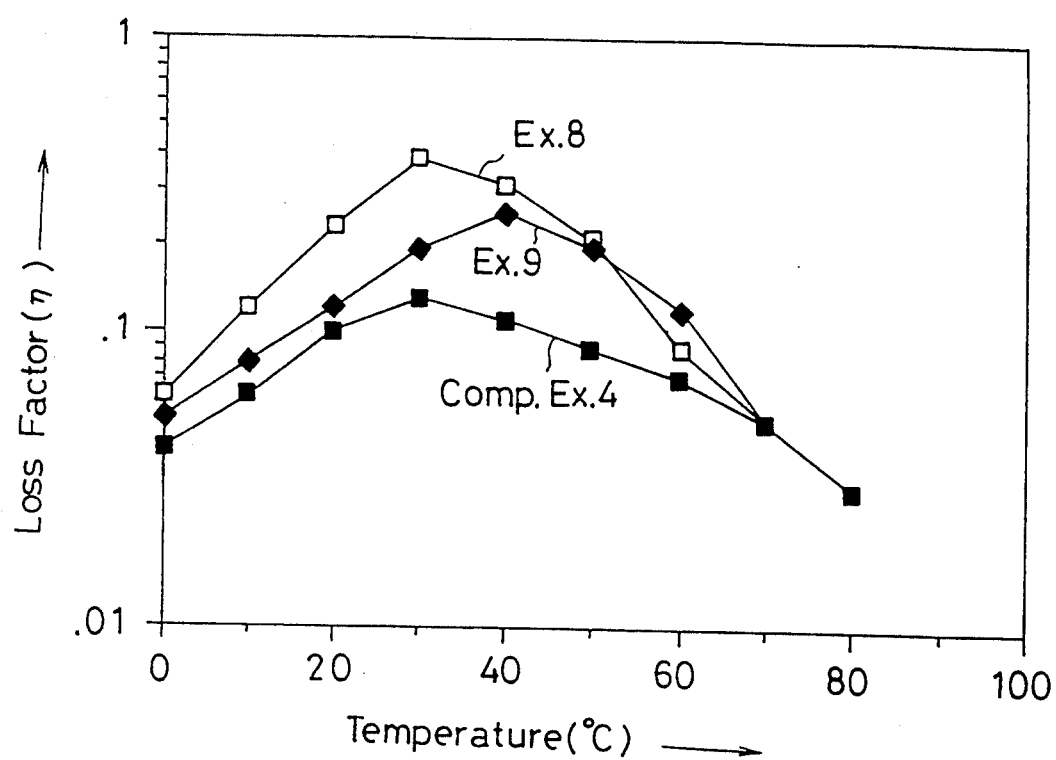
FIG. 3 shows the loss factor ($\eta$) of the vehicle damping sheets at each temperature obtained by Examples 8 and 9, and Comparative Example 4.

FIG. 2 shows the loss factor of the damping sheets of Reference Examples 1 to 3 and Example 1, in which the amount of the filler of the damping sheet of the Example 1 approximates to that of the Reference Example 1 and the thickness of the damping sheet of the Example 1 is 2 mm. In the FIG. 2, the curve D denotes the Example 1. As seen from the FIG. 2, it is clear that the loss factor of the damping sheet of Example 1 is equal to or higher than that of the Reference Example 3, wherein the thickness of the damping sheet of the Reference Example 3 is 3 times as large as that of the Example 1 and the damping sheet of the Example 1 has a damping effect 3 times as high as the conventional damping sheet (Reference Example 1).

This face means that in order to obtain the same damping effect as the conventional products, the thickness of the damping sheet can be reduced to $\frac{1}{3}$.

Also, as seen from the curves A and D in the FIG. 2, the peak value of the loss factor of the Example 1 not only was improved, the loss factor of the Example 1 but also was entirely improved within a wide temperature range and accordingly the higher and more efficient damping effect was obtained within the wide temperature range.

resin, a filler of 40 parts by weight of $Fe_3O_4$ particles (size: 0.3 μm) as the iron oxide particles, 110 parts by weight of mica (size: 150 μm), 25 parts by weight of calcium carbonate, 10 parts by weight of waste paper and 10 parts by weight of a process oil was added and blended. After mixing under heating the blend in a dispersion mixer at 140° C. for 10 min., the thus obtained blend-mixture was rolled spread by a calender rolls to prepare a vehicle damping sheet of 2 mm in thickness.

The resultant vehicle damping sheet was cut into 15 mm in width and 270 mm in length and set on a steel plate substrate of 0.8 mm in thickness (15×300 mm) and fused under heating at 150° C. for 30 min. to obtain a test specimen. The loss factor ($\eta$) of each specimen at each temperature was obtained by a resonance method. The results are as shown in Table 2 and the products were excellent in the damping effect, as well as in the bending resistance.

EXAMPLES 8–11, COMPARATIVE EXAMPLES 4–7

After manufacturing vehicle damping sheets in the same procedures as those in Example 7 except for using materials of compositions each shown in Table 2, test specimens for evaluating the damping effect were obtained. The ethylene-vinyl acetate copolymers used in Examples 7 to 10 and Comparative Examples 4 to 7 contained 28% of vinyl acetate content. The loss factor ($\eta$) of the resultant test specimen at each temperature

TABLE 1

|  |  | Ex. 1 | Ex. 2 | Ex. 3 | Ex. 4 | Ex. 5 | Ex. 6 | Reference Ex. 1 | Reference Ex. 2 | Reference Ex. 3 | Compara. Ex. 1 | Compara. Ex. 2 | Compara. Ex. 3 |
|---|---|---|---|---|---|---|---|---|---|---|---|---|---|
| Blown asphalt | | 60 | 60 | 60 | 60 | 60 | 70 | 60 | 60 | 60 | 60 | 60 | 60 |
| Petroleum resin | | 40 | 40 | 40 | 40 | 40 | 40 | 40 | 40 | 40 | 40 | 40 | 40 |
| Mica | | 65 | 65 | 65 | 20 | 80 | 65 | — | — | — | 60 | 2 | 60 |
| $Fe_3O_4$ | | 10 | 30 | — | 80 | 20 | — | — | — | — | — | 70 | 130 |
| $\gamma$-$Fe_2O_3$ | | — | — | 30 | — | — | 30 | — | — | — | — | — | — |
| Calcium carbonate | | 25 | 25 | 25 | 25 | 25 | 25 | 95 | 95 | 95 | 25 | 25 | 25 |
| Waste paper | | 5 | 5 | 5 | 5 | 5 | 5 | 5 | 5 | 5 | 5 | 5 | 5 |
| Process oil | | 10 | 10 | 5 | 10 | 10 | 10 | 10 | 10 | 10 | 10 | 10 | 10 |
| Thickness of sheet (mm) | | 2 | 2 | 2 | 2 | 2 | 2 | 2 | 3 | 6 | 2 | 2 | 2 |
| Loss | 0° C. | 0.09 | 0.07 | 0.05 | 0.08 | 0.09 | 0.09 | 0.08 | 0.09 | 0.16 | 0.09 | 0.10 | 0.12 |
| Factor | 10° C. | 0.12 | 0.14 | 0.08 | 0.12 | 0.12 | 0.16 | 0.10 | 0.12 | 0.20 | 0.10 | 0.13 | 0.15 |
| ($\eta$) | 20° C. | 0.21 | 0.20 | 0.14 | 0.18 | 0.15 | 0.24 | 0.10 | 0.13 | 0.24 | 0.13 | 0.15 | 0.18 |
|  | 30° C. | 0.26 | 0.30 | 0.21 | 0.21 | 0.20 | 0.29 | 0.08 | 0.13 | 0.24 | 0.14 | 0.14 | 0.17 |
|  | 40° C. | 0.25 | 0.23 | 0.30 | 0.16 | 0.22 | 0.21 | 0.06 | 0.10 | 0.21 | 0.13 | 0.11 | 0.13 |
|  | 50° C. | 0.13 | 0.11 | 0.22 | 0.12 | 0.11 | 0.15 | 0.05 | 0.07 | 0.17 | 0.09 | 0.09 | 0.10 |
|  | 60° C. | 0.07 | 0.05 | 0.12 | 0.07 | 0.06 | 0.09 | 0.04 | 0.06 | 0.14 | 0.06 | 0.07 | 0.06 |
|  | 70° C. | 0.03 | 0.03 | 0.06 | 0.05 | 0.03 | 0.04 | 0.03 | 0.05 | 0.12 | 0.04 | 0.05 | 0.04 |
|  | 80° C. | 0.02 | 0.02 | 0.03 | 0.04 | 0.02 | 0.02 | 0.02 | 0.04 | 0.09 | 0.04 | 0.05 | 0.04 |
| Bending resistance of sheet (room temperature) | | ○ | ○ | ○ | ○ | ○ | ○ | ○ | ○ | Δ | ○ | ○ | x |

EXAMPLE 7

To a binder of 30 parts by weight of ethylene-vinyl acetate copolymer and 70 parts by weight of petroleum and the bending resistance of the sheet are as shown in Table 2.

TABLE 2

|  | Ex. 7 | Ex. 8 | Ex. 9 | Ex. 10 | Ex. 11 | Comp. Ex. 4 | Comp. Ex. 5 | Comp. Ex. 6 | Comp. Ex. 7 |
|---|---|---|---|---|---|---|---|---|---|
| EVA* (VA content) | 30 (28%) | 30 (28%) | 50 (28%) | 40 (28%) | 60 (40%) | 50 (28%) | 50 (28%) | 50 (28%) | 30 (28%) |
|  | 70 | 70 | 50 | 60 | 40 | 50 | 50 | 50 | 70 |
| Mica | 110 | 110 | 30 | 90 | 90 | — | 80 | — | 110 |
| $Fe_3O_4$ | 40 | — | 70 | 20 | 20 | — | — | 80 | 220 |
| $\gamma$-$Fe_2O_3$ | — | 40 | — | — | — | — | — | — | — |
| Calcium carbonate | 25 | 25 | 25 | 25 | 25 | 80 | 20 | 20 | 25 |

TABLE 2-continued

|  |  | Ex. 7 | Ex. 8 | Ex. 9 | Ex. 10 | Ex. 11 | Comp. Ex. 4 | Comp. Ex. 5 | Comp. Ex. 6 | Comp. Ex. 7 |
|---|---|---|---|---|---|---|---|---|---|---|
| Waste paper | | 10 | 10 | 10 | 10 | 10 | 10 | 10 | 10 | 10 |
| Process Oil | | 10 | 10 | 10 | 10 | 10 | 10 | 10 | 10 | 10 |
| Loss factor ($\eta$) | 0° C. | 0.05 | 0.06 | 0.05 | 0.04 | 0.08 | 0.04 | 0.05 | 0.04 | 0.02 |
| | 10° C. | 0.08 | 0.12 | 0.08 | 0.07 | 0.18 | 0.06 | 0.07 | 0.06 | 0.04 |
| | 20° C. | 0.12 | 0.23 | 0.12 | 0.10 | 0.33 | 0.10 | 0.09 | 0.09 | 0.10 |
| | 30° C. | 0.23 | 0.39 | 0.19 | 0.17 | 0.26 | 0.13 | 0.11 | 0.10 | 0.12 |
| | 40° C. | 0.39 | 0.32 | 0.26 | 0.29 | 0.18 | 0.11 | 0.13 | 0.12 | 0.13 |
| | 50° C. | 0.33 | 0.21 | 0.20 | 0.22 | 0.13 | 0.09 | 0.11 | 0.11 | 0.11 |
| | 60° C. | 0.24 | 0.09 | 0.12 | 0.15 | 0.09 | 0.07 | 0.07 | 0.09 | 0.09 |
| | 70° C. | 0.08 | 0.05 | 0.05 | 0.06 | 0.05 | 0.05 | 0.04 | 0.04 | 0.05 |
| | 80° C. | 0.03 | 0.03 | 0.03 | 0.03 | 0.02 | 0.03 | 0.02 | 0.02 | 0.03 |
| Bending resistance of sheet (room temperature) | | ○ | ○ | ○ | ○ | ○ | ○ | ○ | ○ | x |

(NOTE) EVA*: Ethylene-vinylacetate copolymer

We claim:

1. A vehicle damping sheet comprising a blend-mixture comprising a filler composed of mica, iron oxide particles and an auxiliary filler, and a binder containing (a) bituminous material of (b) ethylene vinyl acetate copolymers,
    the amount of said auxiliary filler being not less than 5 parts by weight based on 100 parts by weight of said binder,
    each of the amounts of said mica and said iron oxide particles being 5 to 200 parts by weight based on 100 parts by weight of said binder,
    the total amount of said mica, said iron oxide particles and said auxiliary filler being not less than 30 parts by weight based on 100 parts by weight of said binder, and
    the content of said iron oxide particles in said blend-mixture being from 2 to 40% by weight wherein the vehicle damping sheet has a loss factor ($\eta$) of at least 0.20 measured in a 2 mm thick specimen applied to a 0.8 mm thick substrate.

2. A vehicle damping sheet according to claim 1, wherein said binder contains not less than 20% by weight of the bituminous material.

3. A vehicle damping sheet according to claim 1, wherein said binder contains not less than 5% by weight of ethylene-vinyl acetate copolymers.

4. A vehicle damping sheet according to claim 1, wherein a content vinyl acetate of said ethylene-vinyl acetate copolymers is from 25 to 60%.

5. A vehicle damping sheet according to claim 1, wherein the size of mica is not greater than 350 $\mu$m.

6. A vehicle damping sheet according to claim 1, wherein the particle size of the iron oxide particles is from 0.05 to 100 $\mu$m.

7. A vehicle damping sheet according to claim 1, wherein the blending ratio (by weight) of the iron oxide particles to the mica is 0 05–10 : 1.

* * * * *